(12) United States Patent
Grisenthwaite et al.

(10) Patent No.: US 7,797,681 B2
(45) Date of Patent: Sep. 14, 2010

(54) STACK MEMORY SELECTION UPON EXCEPTION IN A DATA PROCESSING SYSTEM

(75) Inventors: Richard Roy Grisenthwaite, Nr Royston (GB); Paul Kimelman, Alamo, CA (US); David James Seal, Cambridge (GB); David Aaron Rusling, Wokingham (GB)

(73) Assignee: ARM Limited, Cambridge (GB)

( * ) Notice: Subject to any disclaimer, the term of this patent is extended or adjusted under 35 U.S.C. 154(b) by 1138 days.

(21) Appl. No.: 11/431,926

(22) Filed: May 11, 2006

(65) Prior Publication Data
US 2007/0266374 A1    Nov. 15, 2007

(51) Int. Cl.
*G06F 9/44* (2006.01)

(52) U.S. Cl. .................................... 717/124
(58) Field of Classification Search ............... None
See application file for complete search history.

(56) References Cited

U.S. PATENT DOCUMENTS

| 6,694,457 B2 * | 2/2004 | McKee ................. 714/38 |
| 6,904,517 B2 * | 6/2005 | Nevill et al. ........... 712/228 |
| 2001/0044886 A1 * | 11/2001 | Cassagnol et al. .......... 711/163 |
| 2006/0059486 A1 * | 3/2006 | Loh et al. ................. 718/100 |

OTHER PUBLICATIONS

Aditya Mathur, "Introduction To Microprocessors", 1990, McGraw-Hill Education, Third Edition, pp. 461-463, 494-499.*

* cited by examiner

*Primary Examiner*—Wei Y Zhen
*Assistant Examiner*—Lanny Ung
(74) *Attorney, Agent, or Firm*—Nixon & Vanderhye P.C.

(57) ABSTRACT

A data processor 2 has privilege levels associated with it including a user level and a privileged level. The processor 2 also has multiple stack memories which can be used including one or more process stacks, a main stack and a deep stack. The stack memory to be used is de-coupled from the privilege level. An activation level state variable tracking the number of pending exceptions is held by the processor and used to modify which stack memory stores pending state values when an exception occurs. If the system is at a base level of activation, corresponding to currently no pending exceptions, then when an exception occurs the current state data is saved on the process stack with the main stack being available for the exception handling code. Particular exceptions can be flagged as requiring use of a deep stack rather than either the process stack or the main stack. If the system is not at the base level of activation, then the main stack is used to save state variables when an exception occurs rather than the process stack.

40 Claims, 6 Drawing Sheets

If at Base Level:
    If target = Main
        stack to process stack upon exception
    else
        stack to deep stack upon exception
else
    If target = main
        stack to main stack upon exception
    else
        stack to deep stack upon exception

Fig. 4

STACK MEMORY SELECTION UPON EXCEPTION IN A DATA PROCESSING SYSTEM

BACKGROUND OF THE INVENTION

1. Field of the Invention

This invention relates to data processing systems. More particularly, this invention relates to the saving of processor state data on a stack memory when an exception occurs.

2. Description of the Prior Art

It is known to provide data processing systems operable at multiple privilege levels, such as a user level and a privileged level (different privilege levels have different access permissions within the system, higher levels of privilege having greater access, such as, for example, to instructions, configuration parameters memory, etc.) Within these systems separate stack pointers directed to respective stack memory areas are provided for use in each level of privilege. Accordingly, when operating at the user level the user level stack pointer operates to indicate the memory address to which data values are to be pushed or from which data values are to be popped when a stack memory access is made. Similarly, when operating at the privileged level, a privileged level stack pointer indicates a separate memory address region used as the privileged level stack.

Known operation of such systems responds to the occurrence of an exception when in the user level, whether that be a hardware generated exception or a software generated exception, to switch the processor from the user level to the privileged level. At the same time a corresponding switch is made in the stack pointer to be used. It will be appreciated that the state of the processor prior to the occurrence of the exception needs to be saved such that when the interrupted processing is resumed after the exception has been dealt with, this state information can be restored and the original processing resumed unaltered. Existing systems meet this requirement by providing hardware mechanisms acting upon occurrence of an exception to store certain user level state data onto the privileged level stack as part of the hardware response to the occurrence of the exception. The code responsible for processing the exception within the privilege level acts as one of its first jobs to save off this stacked state data into a task control block associated with the task which was operating prior to occurrence of the exception. In this way, should a further exception occur whilst the original exception is being dealt with, then the original state data is not lost or confused by being submerged on the privileged level stack. When it is desired to return to the original task, the saved state data can be retrieved from the task control block and placed back at the top of the privilege level stack such that when the return is made, this state data can be restored under hardware control back to the original locations and processing resumed.

Within the field of deeply embedded processors one style of operation is to utilise processors that are predominantly interrupt driven. Various events which require processing activity to be performed occur largely asynchronously and can be signalled by the generation of an associated interrupt causing the processor to activate appropriate processing code to deal with that processing requirement. Thus, a given processor can be rendered responsible for managing several different events with those events triggering their associated processing activity using interrupts applied to the processor. In the context of such a system, the time taken to switch between processing tasks can become critical. As an example, some processing tasks may have a much higher objective priority than others. A process for controlling a safety critical system should be able to pre-empt an already running process for a non-safety critical system. In this regard the time taken to switch between different processing tasks (contexts) becomes a significant performance parameter.

SUMMARY OF THE INVENTION

Viewed from one aspect the present invention provides apparatus for processing data, said apparatus comprising:

a memory operable to store data values;

processing logic operable to execute a sequence of program instructions and having a plurality of privilege levels including at least a user level and a privileged level;

a process stack memory pointer pointing to a process stack memory region within said memory for use when said processing logic is at said user level;

a main stack memory pointer pointing to a main stack memory region within said memory for use when said processing logic is at said privileged level;

exception logic responsive to an exception occurring when said processing logic is executing a process sequence of program instructions at said user level:

(i) to stop executing said process sequence of program instructions;

(ii) to save user level state data representing one or more state variables of said apparatus when said exception occurred to said process stack memory region;

(iii) to switch said processing logic from said user level to said privileged level; and (iv) to start executing a privileged level sequence of program instructions.

The present technique recognises that the time taken to save off state data stored on the privileged level stack memory upon occurrence of an exception out to a task control block and later restore this represents a disadvantageous additional processing overhead that needs to be performed when a context switch is desired. This issue is addressed by altering the behaviour of the system such that upon occurrence of an exception when operating at a user level of privilege (e.g. corresponding to a normal application process), then the state data associated with that currently executing process is saved to the process stack memory associated with that user level process rather than to the main stack memory associated with the privileged level of operation to which the switch is made upon occurrence of the exception. This frees the code executing at the privileged level to handle the exception from the need to save off the state data from its main stack and restore the state data to the main stack upon entry and at exit from the privileged level during a context switch. The required state data remains safely stored on its associated process stack from where it can be restored under hardware or software control at exit from the exception handling. This speeds context switches.

This technique runs against the technical prejudice in the field since it is normally arranged and considered desirable that upon occurrence of an exception processing resources dedicated to the privileged level of operation that will deal with that exception should be used for any required action. Isolating exception handling from the process running when that exception occurred is considered desirable to avoid circumvention of the normal hierarchy of permissions associated with the differentiation between user level and privileged level and to avoid the possibility of actions triggered within the process level resources upon occurrence of an exception themselves resulting in a further exception and a loop condition arising.

Whilst the restoring of the user level state data at the end of exception handling could be performed under software control within the privileged level, preferred embodiments utilise the exception logic to perform this restoration under hardware control.

The occurrence of nested exceptions when one exception occurs before a preceding exception has been fully dealt with can be handled using an arrangement in which the hardware tracks an activation level extending from a base level upwards with the activation level being incremented each time an exception occurs and decremented when that exception is dealt with/cleared. In this way, unless the system is at the base activation level when an exception occurs, the saving of the state data from a pre-empted interrupt service routine can be made to the main stack associated with the privileged level rather than the process stack to avoid state data from the pre-empted interrupt service routine becoming inappropriately placed on the process stack.

Some of the problems occurring due to exceptions resulting from the behaviour responsive to a preceding exception can be addressed by provision of a further stack memory with an associated pointer and a stack identifier associated with at least some exceptions to steer the stack memory to be used for user level state data storage upon occurrence of particular exceptions to be the further stack memory rather than the process or main stack memory. Thus, exception types which can be caused due to the exception responsive behaviour when the state data being stored on an exception is stored on the process or main stack, such as exceptions associated with the process or main stack behaviour itself, can be steered to use the further stack memory rather than the process or main stack. Such behaviour reduces the likelihood of loop conditions arising.

The risk of inappropriate circumvention of the mechanisms controlling which privilege level is associated with a process may be reduced by arranging the apparatus such that the state data defining privilege level is stored independently of the user level state data which is pushed to the process stack such that this privilege level defining data can not be accidentally or maliciously manipulated by an inappropriate access to the process level stack which in itself is not protected by an associated privileged level of access.

Switches to the privileged level from the user level can occur as the result of service calls from a user level process to a privileged level process, such as an operating system. These are normal ways of arranging for isolation between applications and operating system functions. When such service calls occur it is desirable that moving the system to the privileged level should not inhibit context switch time performance, which may result from an exception arising whilst that service call is pending. This is facilitated by de-coupling the level of activation from the privilege level such that the system can return to the base level of activation whilst remaining at the privileged level. The system call code operating at the privileged level can accordingly perform the required housekeeping early in its execution to ensure that an appropriate resumption of the calling process may be made at a later time should an exception occur whilst that service call remains pending. A return can then be made to the base level of activation whilst remaining at the privileged level and using a pointer to a privileged stack for the process stack pointer. In this way, privileged access right retained. However, since a return has been made to the base level, the process stack can be used for state data storage should a further exception occur with the process stack then representing state data associated with the service call handling being performed by the privileged level operation.

In order to facilitate the above, one or more software accessible control bits is used to control whether the processing logic is at the user level or the privileged level when at the base level. These configuration bits may be made only writable from within the privileged level.

It will be appreciated that the exceptions may have a variety of forms including hardware generated interrupts and software generated interrupts.

The user level state data may also take a wide variety of forms, such as including one or more registers values from a register bank, a value stored within the process stack memory pointer, a pending branch return address value, a program counter value and/or one or more processor flag values.

Viewed from another aspect the present invention provides a method of processing data, said method comprising:

storing data values in a memory;

executing a sequence of program instructions using processing logic having a plurality of privilege levels including at least a user level and a privileged level;

pointing with a process stack memory pointer to a process stack memory region within said memory for use when said processing logic is at said user level;

pointing with a main stack memory pointer to a main stack memory region within said memory for use when said processing logic is at said privileged level;

in response to an exception occurring when said processing logic is executing a process sequence of program instructions at said user level:

(i) stopping executing said process sequence of program instructions;

(ii) saving user level state data representing one or more state variables of said apparatus when said exception occurred to said process stack memory region;

(iii) switching said processing logic from said user level to said privileged level; and (iv) starting executing a privileged level sequence of program instructions.

Viewed from a further aspect the present invention provides apparatus for processing data, said apparatus comprising:

memory means for storing data values;

processing means for executing a sequence of program instructions and having a plurality of privilege levels including at least a user level and a privileged level;

process stack memory pointer means for pointing to a process stack memory region within said memory for use when said processing logic is at said user level;

main stack memory pointer means for pointing to a main stack memory region within said memory for use when said processing logic is at said privileged level;

exception means responsive to an exception occurring when said processing logic is executing a process sequence of program instructions at said user level for:

(i) stopping executing said process sequence of program instructions;

(ii) saving user level state data representing one or more state variables of said apparatus when said exception occurred to said process stack memory region;

(iii) switching said processing logic from said user level to said privileged level; and (iv) starting executing a privileged level sequence of program instructions.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 is a pseudocode representation of the flow diagram of FIG. 3A;

DESCRIPTION OF THE PREFERRED EMBODIMENTS

Figure 1:
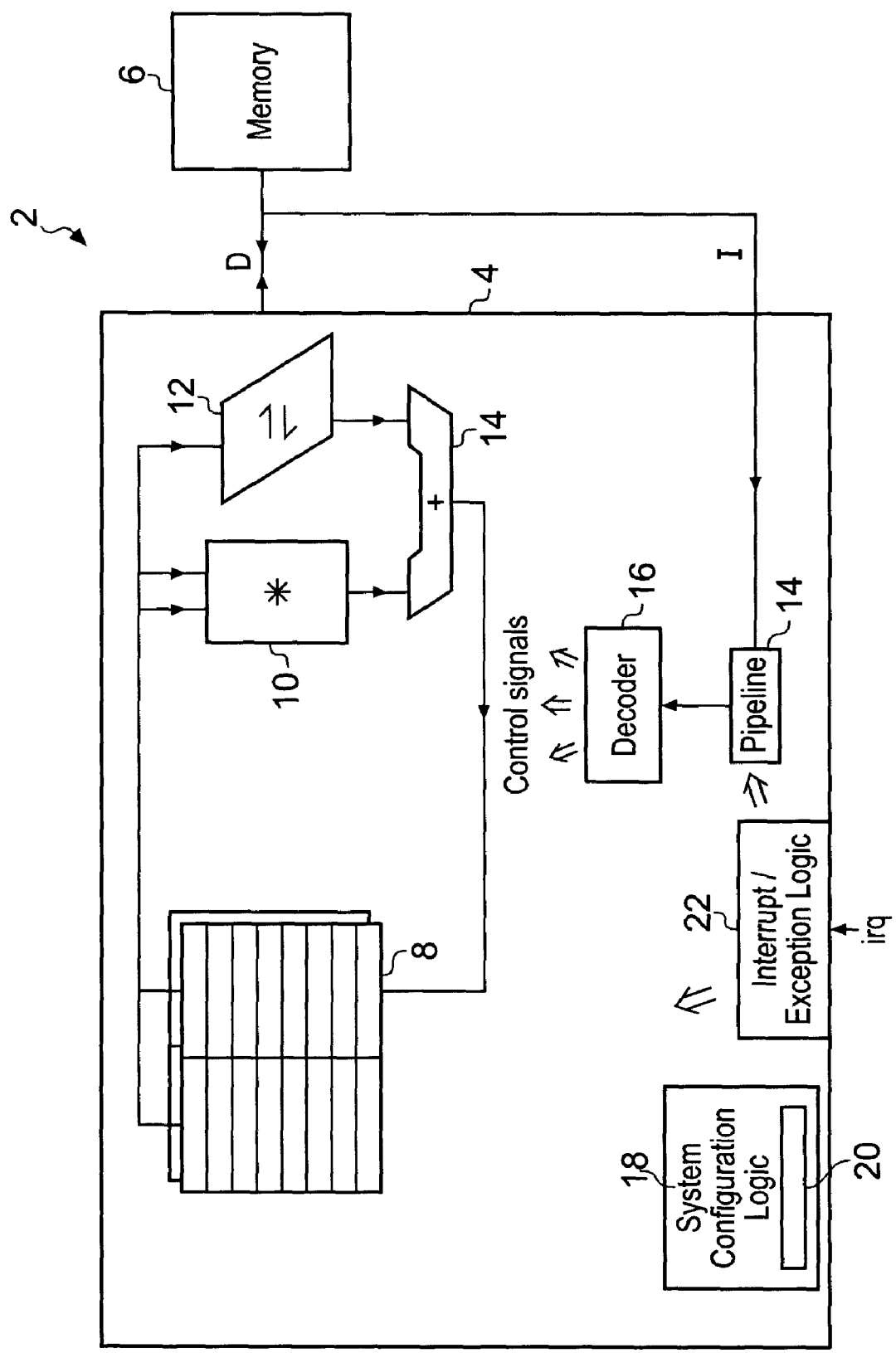
FIG. 1 schematically illustrates a data processing system of a type responsive to exceptions to change privilege levels.

FIG. 1 illustrates a data processing system 2 having a processor 4 coupled to a memory 6. The memory 6 stores program instructions for controlling the processor 4 as well data values to be manipulated by the processor 4. The processor 4 includes, for example, a register bank 8, a multiplier 10, a shifter 12 and an adder 14. Data values are read from the register bank 8 manipulated by one or more of the multiplier 8, the shifter 12 and the adder 14 and result values returned to the register bank 8. Instructions I fetched from the memory 6 enter an instruction pipeline 14 along which they progress until they reach a decode state at which stage decode logic 16 serves to generate control signals to configure and control the register file 8, the multiplier 10, the shifter 12 and the adder 14 to perform the desired processing operations. It will be appreciated that the illustration of FIG. 1 is highly simplified and that in practice a processor 4 will typically include many further processing elements. System configuration logic 18 associated with the processor 4 contains one or more configuration registers 20 storing configuration bits for the processor 4. One or more of these configuration bits can be used to indicate the privilege level of the processor 4 when at the base level of activation and also to indicate which stack to use currently at the base level of activation. These privilege level controlling bits can be written under software control by a process having the appropriate permissions (e.g. a privileged level process). The privilege level can also be changed under hardware control in response to software or hardware generated exceptions.

Exception logic 22 within the processor 4 is responsive to external interrupt signals irq to trigger exception processing behaviour. Software program instructions decoded by the decoder 16 can also trigger software generated exceptions, such as service calls (software interrupts) to an operating system which require a switch to a privileged level of operation and can be treated as exceptions. In the context of a deeply embedded processing system, the processing performed can be predominately interrupt driven with many external hardware interrupt signals being supplied to the exception logic 22. Respective interrupt signals can be associated with different hardware elements being controlled by the processor 4, such as a braking system, an entertainment system, headlights system etc.

Figure 2:
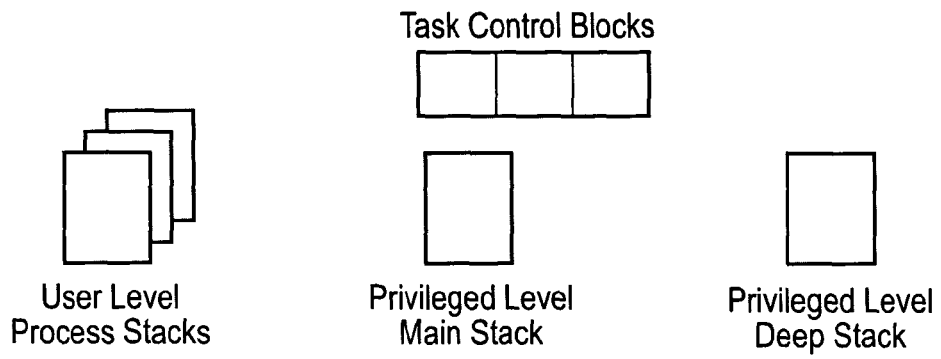
FIG. 2 schematically illustrates stack memories used within the system of FIG. 1 together with task control blocks used for managing the switching between processing tasks.

FIG. 2 schematically illustrates several process stacks, a main stack and a deep stack. These stacks are located within the memory 6 and are selectively used by the processor 4 as will be described below.

The stack to be used is not fixed for a given privilege level but is de-coupled therefrom. When a user level process is executing its sequence of program instructions an exception can arise, either a hardware interrupt or a service call, requiring a switch to a privileged level of operation and execution of some associated code at that privileged level. State data associated with the state of the processor 4 at the point at which the exception occurred is stored to a stack memory such that it can be recovered and restored when that user level program is to be resumed. The user level state data can include one or more register values from the register bank 8, a pending branch return address value, which may also be stored within one of the registers of the register bank 8, a program counter value PC and one or more processor flags, such as condition code flags which may be existing at the time the exception occurred. The type of state data stored upon an interrupt will be familiar to those in the field and will vary from system to system.

This user level state data is stored within the current process stack being used by the program concerned when the exception occurs providing the system is at a base level of activation and the exception is not marked as requiring use of the deep stack. The saving of this user level state data is a hardware operation controlled by the exception logic 22 and accordingly is rapidly performed. The exception logic 22 also responds to the exception by incrementing the activation level associated with the processor 4 from a base level to a higher level. The processor 4 is also moved from a user level of privilege to a privileged level of privilege. The exception processing code executed subsequent to the exception has a privileged level of access to processor resources. The privileged level processing utilises its associated main stack memory. The user level state data is stored in the process stack associated with the user level program which has been interrupted and so there is no requirement for the privileged level program to store away this user level state data into an associated task control block. However, the privileged level program will typically store other information away in the task control block, such as an identifier of the task which has been interrupted, its stack pointer and any registers not saved by the hardware on exception entry.

The behaviour discussed above assumes that the exception which occurred was not one which was flagged as requiring use of the deep stack rather than the process stack. Exceptions can have indicators associated with them which override the normal behaviour of the system in using the process stack of the user level to store the user level state data and instead force the user level state data to be stored within a deep stack which is provided in addition to the main stack. One type of exception which may be forced to use the deep stack is memory access exceptions since these can be associated with problems in the process stack accesses and having the exception logic 22 automatically force further process stack accesses upon the occurrence of memory access exceptions could lead to a loop condition in which the response to one exception leads to a further exception and so on, e.g. the space available for the process stack has been exceeded and the resulting memory access exception merely trigger a further memory access attempt which cannot be met.

When a return is made from an exception, the exception handling code may under software control act to read the process stack where the user level state data was stored and restore this data prior to the execution of the user level code being resumed. Alternatively, this restoration of the user level state data could take place partially or wholly under hardware control driven by the exception logic 22 noting the completion of the exception processing. When the exception processing has been completed, the activation level of the processor is decremented back toward the base level.

The activation level tracking enables nested interrupts to be accommodated and the behaviour of the system to be adjusted in dependence upon whether or not nested interrupts are present. In particular, the use of the process stacks to store the user level state data upon occurrence of an exception can be restricted to situations in which the processor 4 is at the base activation level when the exception occurs. At higher activation levels, the exception logic triggers the use of the main stack rather than the process stack to store the user level state data. This can avoid the situation in which multiple exceptions can result in the inappropriate submerging of user level state data on the process stack with this being untracked or complicated in a manner that the appropriate user level state data cannot be successfully restored when it is required.

If the exception occurring is one which is marked as requiring use of the deep stack, then this deep stack will be used to store the user level state data irrespective of the activation level of the processor. It will be appreciated from the above that there is effectively a de-coupling between the stack to be used when an exception occurs to store the user level state data and the privilege level of the system at that time.

Figure 3A:
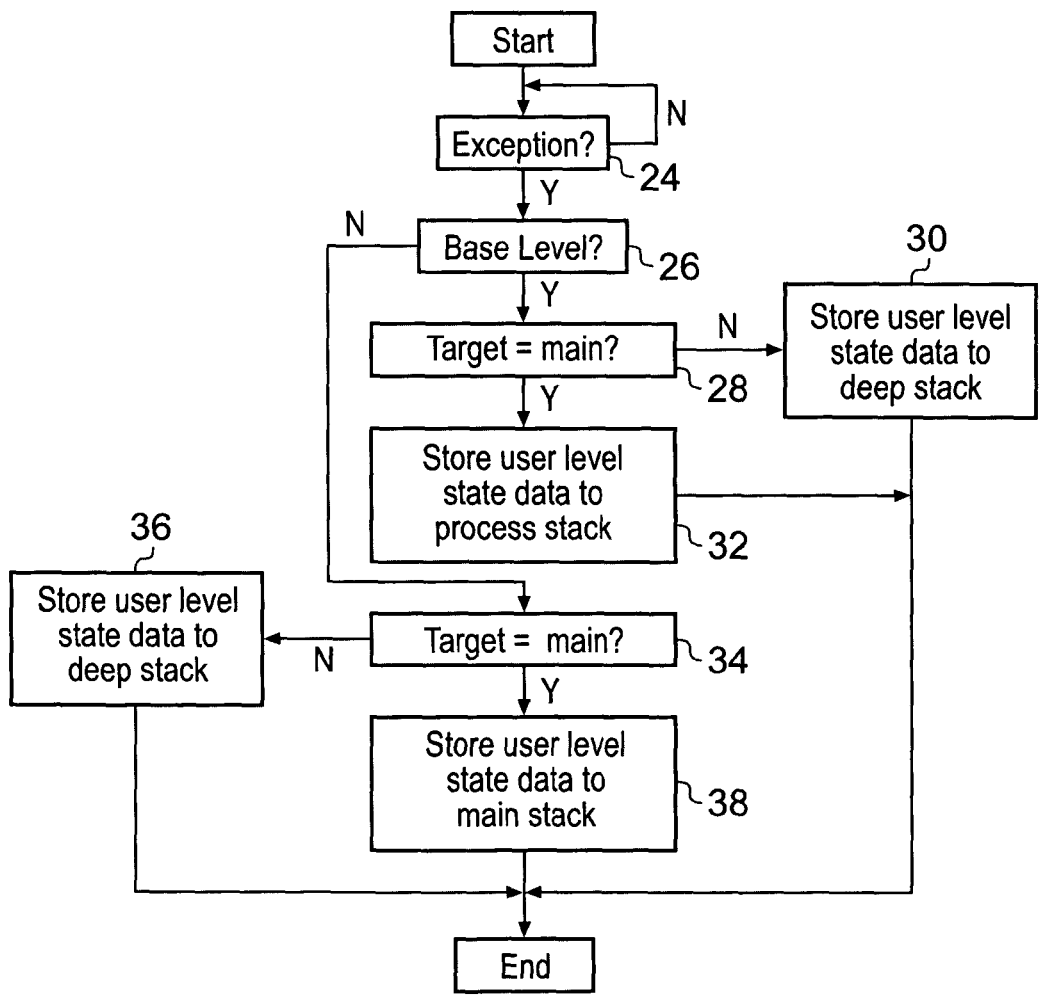
FIG. 3A is a flow diagram schematically illustrating the selection of a stack memory to be used for saving user level state data upon occurrence of an exception.

FIG. 3A schematically illustrates a flow diagram showing the stack selection performed by the exception logic 22 upon occurrence of an exception. In practice this selection may be performed as a hardware process. At step 24 the system waits for an exception to occur. When an exception occurs, processing proceeds to step 26 at which a check is made as to whether or not the processor core is currently at the base activation level. If the system is at the base activation level, then processing proceeds to step 28 where a determination is made as to whether or not the exception is marked as one requiring use of the deep stack or the main stack. If the exception is marked as requiring use of the deep stack, then processing proceeds to step 30 and the user level state data is stored to the deep stack and the processing of the flow diagram is finished. If the exception is marked as requiring use of the main stack, then processing proceeds to step 32. Step 32 overrides the indication of use of the main stack when the system is at the base activation level and instead uses the process stack associated with the current user level program which is being interrupted to store the user level state data. This relieves the exception handling code from the need to have to store away the user level state data into the task control block and recover it therefrom as part of its operation. This makes context switching a more rapid operation.

If the determination at step 26 was that the activation level is above the base activation level, then processing proceeds to step 34. Step 34 again checks whether the exception is one marked as requiring use of the deep stack. If the use of the deep stack is indicated, then step 36 stores the user level state data to the deep stack. If the determination at step 34 was that use of the deep stack is not indicated, then in this case where the system is above the base activation level step 38 serves to store the user level state data to the main stack.

Figure 3B:
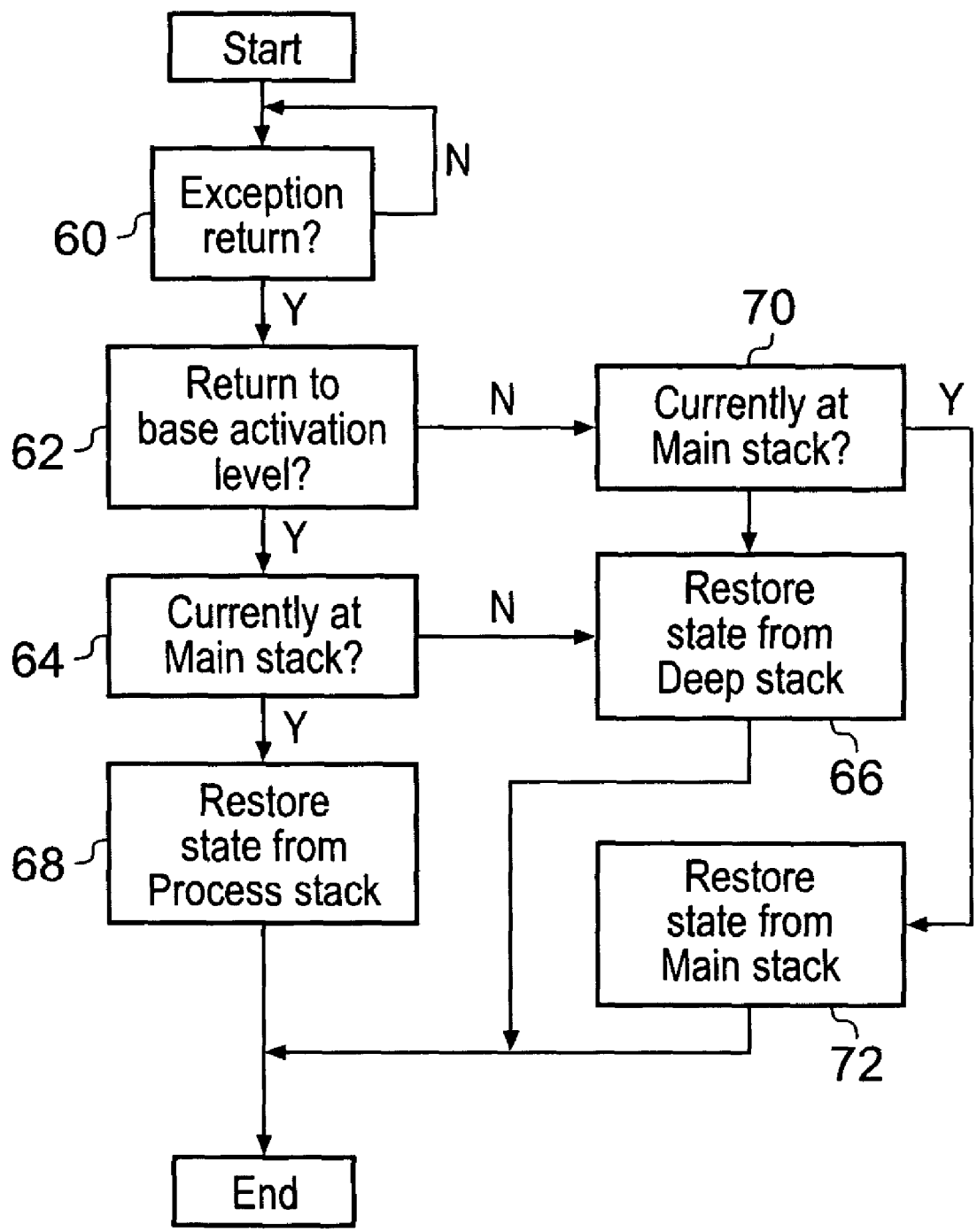
FIG. 3B is a flow diagram schematically illustrating a return from exception operation.

FIG. 3B is a flow diagram schematically illustrating a return from an exception operation.

At step 60 the exception logic waits for a return from exception instruction to be executed. When a return from exception occurs, processing proceeds to step 62 at which a check is made as to whether the return being made is a return to a base activation level. If the return is to a base activation level, then processing proceeds to step 64 at which a check is made as to whether the stack currently in use is the main stack. If the stack currently in use is not the main stack, then processing proceeds to step 66 and a restore operation of the saved state data is performed from the deep stack before processing terminates. If the determination at step 64 was that the currently used stack is the main stack, then processing proceeds to step 68 at which a restore operation is made from the processed stack.

If the determination at step 62 was that the return is not being made to the base level of activation, then processing proceeds to step 70 at which a check is made as to whether the currently used stack is the main stack. If the currently used stack is not the main stack then step 66 performs a restore from the deep stack. If the currently used stack is the main stack, then the restore is performed from the main stack at step 72.

FIG. 4 is a pseudo code representation of the flow diagram processing of FIG. 3A.

Figure 5:
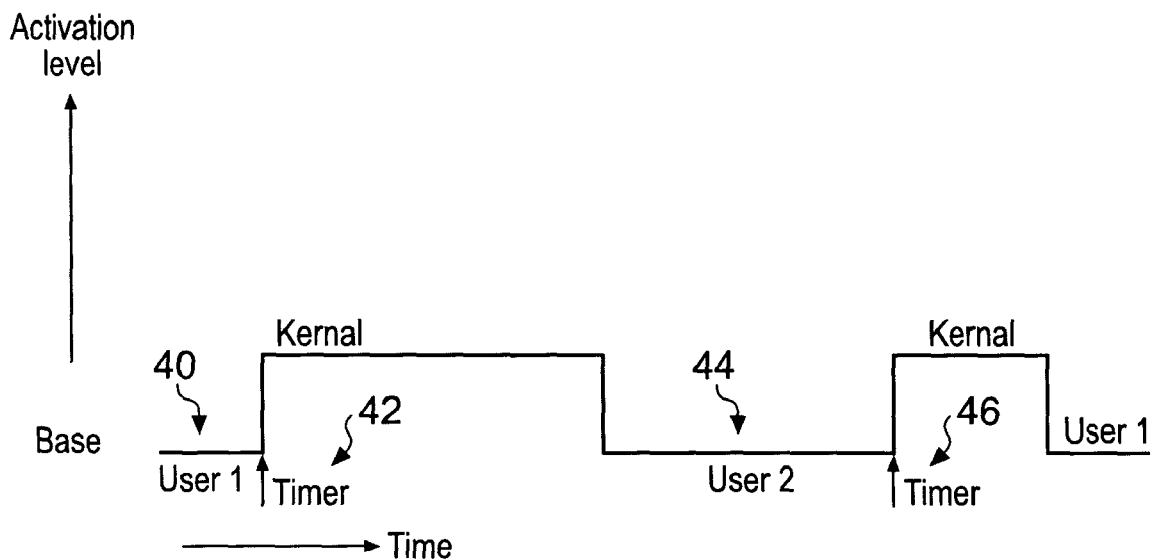
FIG. 5 illustrates a context switch.

FIG. 5 schematically illustrates the variation of activation level with time during a context switch. At portion 40 a first user level process executing. This user level process has its associated user level register file and user level stack. The user level stack is stored within the memory 6 at a location indicated by a user level stacked memory pointer. A timer tick 42 then occurs triggering an interrupt indicating that the operating system should perform a context switch to a different process, or at least check whether such is required, and this is responded to in the form of exception processing which raises the activation level above the base activation level and stops execution of the user level program. The user level state data including one or more register values from the register bank 8, a value of the current process stack pointer, any pending branch return address value, a program counter value and one or more processor condition code flags are stored away to the current process stack associated with the user level. Multiple user level application programs may use respective separate process stack memories. The operating system kernel program then commences execution and performs a context switch to start execution of a further user level program 44. This context switch is made without the kernel being required to push user level state data from its main stack into task control blocks and recover previously stored user level state data for the different task from its associated task control block prior to starting the new user level program 44.

FIG. 5 indicates a later occurrence of a timer tick 46 which again triggers exception processing by the kernel of the operating system and a context switch back to the original user level program 40. This context switch restores the user level state data stored on the process stack associated with the first user program at the point which it was interrupted and resumes the execution of the first user program.

Figure 6:
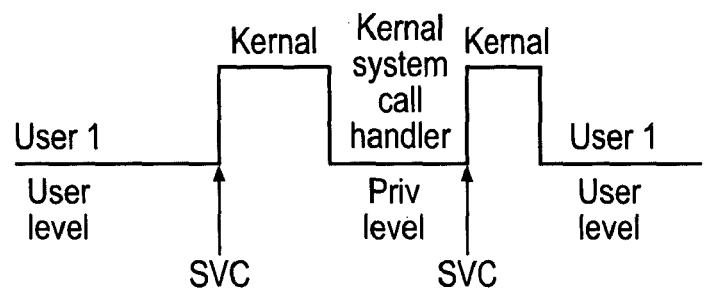
FIG. 6 illustrates a service call.

FIG. 6 again illustrates the variation of activation level with time when dealing with a service call SVC to an operating system. During execution of a user level program at a user level of privilege a service call SVC is made to the operating system. This raises the activation level of the processor 4 since the service call SVC is treated as a software generated exception. The kernel program executes at this higher activation level for a short period of time, but then decrements the activation level back to the base level after an appropriate record has been made of the calling program and its process stack location. When returning back to the base level of activation the kernel keeps the privilege level as privileged rather than returning it to user level. This enables the kernel to execute at the base activation level but with privileged level access rights as may be required to properly deal with the service call request.

On completion of the kernel system call handler, the handler issues an SVC, which is treated as a software generated exception, so raising the activation level of the processor 4. The kernel executes at this higher activation level for a short period of time to switch the return location to user level. When returning back to the base level of activation, the original user level program resumes execution.

It will be appreciated that the use of the base level of activation for processing of the kernel system call handler allows the handling of a timer interrupt causing a context switch during the kernel system call handler, and the same benefits of using the process stack to hold the state of the system call handler when switching to another process. This behaviour is illustrated in FIG. 7.

Figure 7:
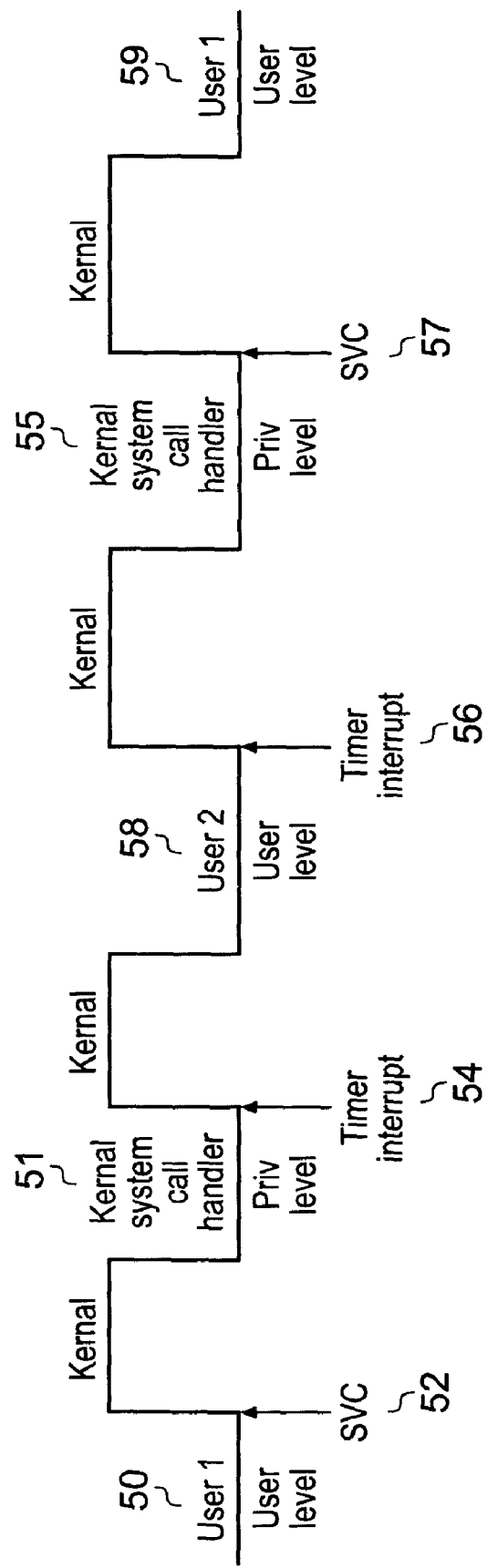
FIG. 7 illustrates a service call with a context switch during the service call.

In FIG. 7, a first user process 50 issues an SVC 52 which causes a raising of the activation level and entry into the kernel. The kernel returns to run the kernel system call handler 51 at a privileged level using the process stack (which has been switched to a privileged process stack). This handler is in turn interrupted by a timing interrupt 54, which causes entry into the kernel, and a context switch occurs to a second user process 58 on return from the kernel. As the state from the kernel system call handler has been saved on the process stack, the context switch again does not need to save this state from the main stack to a thread control block, so the benefits on the context switch time apply even in this system call case.

Later, a second timing interrupt 56 occurs, and causes entry into the kernel. A further context switch occurs to return the kernel system core handler 55 called by the first user process 50. When this kernel system call handler completes, it issues an SVC 57 to enter the kernel and switch back to the original first user process at the user level 59.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   a memory configured to store data values;
   processing logic configured to execute a sequence of program instructions and having a plurality of privilege levels including at least a user level and a privileged level;
   a process stack memory pointer configured to point to a process stack memory region within said memory for use when said processing logic is at said user level;
   a main stack memory pointer configured to point to a main stack memory region within said memory for use when said processing logic is at said privileged level; and
   exception logic, responsive to an exception occurring when said processing logic is executing a process sequence of program instructions at said user level, said exception logic configured to operate in the following sequence:
   (i) to stop executing said process sequence of program instructions;
   (ii) to save user level state data representing one or more state variables of said apparatus when said exception occurred to said process stack memory region;
   (iii) to switch said processing logic from said user level to said privileged level; and
   (iv) to start executing a privileged level sequence of program instructions.

2. Apparatus as claimed in claim 1, wherein said exception logic is operable upon returning to said user level to restart execution of said process sequence of program instruction to read said user level state data from said process stack memory region and to restore said one or more state variables of said apparatus.

3. Apparatus as claimed in claim 1, wherein said processing logic has a sequence of activation levels extending from a base level to one or more non-base levels occurrence of an exception moving said processing logic to a next activation level away from said base level and a return from an exception moving said processing logic to a next activation level toward said base level.

4. Apparatus as claimed in claim 3, wherein, if said processing logic is not at said base level, then upon occurrence of said exception said user level state data is saved to said main stack memory region instead of to said process stack memory region.

5. Apparatus as claimed in claim 1, further comprising a further stack memory pointer pointing to a further stack memory region within said memory and a stack identifier is associated with said exception and controls said exception logic to store said user level state data to said further stack memory region.

6. Apparatus as claimed in claim 1, wherein state data defining a privilege level of said processing logic upon occurrence of said exception is stored independently of said user level state data.

7. Apparatus as claimed in claim 3, wherein program instruction control is operable to return said processing logic to said base level whilst remaining at said privileged level.

8. Apparatus as claimed in claim 7, wherein one or more software accessible configuration bits controls whether said processing logic is at said user level or said privileged level when at said base level.

9. Apparatus as claimed in claim 1, wherein said exception is one of:
   a hardware generated interrupt; and
   a software generated exception.

10. Apparatus as claimed in claim 1, wherein said user level state data includes one or more of:
    one or more register values from a register bank;
    a value stored within said process stack memory pointer;
    a pending branch return address value;
    a program counter value; and
    one or more processor flag values.

11. A method of processing data, said method comprising the steps of:
    storing data values in a memory;
    executing a sequence of program instructions using processing logic configured to have a plurality of privilege levels including at least a user level and a privileged level;
    pointing with a process stack memory pointer to a process stack memory region within said memory for use when said processing logic is at said user level;
    pointing with a main stack memory pointer to a main stack memory region within said memory for use when said processing logic is at said privileged level;
    in response to an exception occurring when said processing logic is executing a process sequence of program instructions at said user level, the following sequence of steps:
    (i) stopping executing said process sequence of program instructions;

(ii) saving user level state data representing one or more state variables of said apparatus when said exception occurred to said process stack memory region;
(iii) switching said processing logic from said user level to said privileged level; and
(iv) starting executing a privileged level sequence of program instructions.

12. Apparatus for processing data, said apparatus comprising:
memory means for storing data values;
processing means for executing a sequence of program instructions and having a plurality of privilege levels including at least a user level and a privileged level;
process stack memory pointer means for pointing to a process stack memory region within said memory for use when said processing logic is at said user level;
main stack memory pointer means for pointing to a main stack memory region within said memory for use when said processing logic is at said privileged level;
exception means, responsive to an exception occurring when said processing logic is executing a process sequence of program instructions at said user level in the following sequence, for:
(i) stopping executing said process sequence of program instructions;
(ii) saving user level state data representing one or more state variables of said apparatus when said exception occurred to said process stack memory region;
(iii) switching said processing logic from said user level to said privileged level; and
(iv) starting executing a privileged level sequence of program instructions.

13. Apparatus for processing data, said apparatus comprising:
a memory configured to store data values;
processing logic configured to execute a sequence of program instructions and having a plurality of levels including at least a base level and a non-base level;
a process stack memory pointer configured to point to a process stack memory region within said memory for use when said processing logic is at said base level;
a main stack memory pointer configured to point to a main stack memory region within said memory for use when said processing logic is at said non-base level;
exception logic, responsive to an exception occurring when said processing logic is executing a process sequence of program instructions at said base level, said exception logic configured to implement the following sequence:
(i) to stop executing said process sequence of program instructions;
(ii) to save state data representing one or more state variables of said apparatus when said exception occurred to said process stack memory region;
(iii) to switch said processing logic from said base level to said non-base level; and
(iv) to start executing a non-base level sequence of program instructions.

14. Apparatus as claimed in claim 13, wherein said plurality of levels are a plurality of privilege levels, said base level is a user level and said non-base level is a privileged level.

15. Apparatus as claimed in claim 13, wherein said exception logic is operable upon returning to said base level to restart execution of said process sequence of program instruction to read said base level state data from said process stack memory region and to restore said one or more state variables of said apparatus.

16. Apparatus as claimed in claim 13, wherein said plurality of levels are a sequence of activation levels extending from said base level to one or more non-base levels, occurrence of an exception moving said processing logic to a next activation level away from said base level and a return from an exception moving said processing logic to a next activation level toward said base level.

17. Apparatus as claimed in claim 16, wherein, if said processing logic is not at said base level, then upon occurrence of said exception said state data is saved to said main stack memory region instead of to said process stack memory region.

18. Apparatus as claimed in claim 13, further comprising a further stack memory pointer pointing to a further stack memory region within said memory and a stack identifier associated with said exception and controlling said exception logic to store said state data to said further stack memory region rather than said main stack memory region.

19. Apparatus as claimed in claim 13, wherein state data defining a level said processing logic upon occurrence of said exception is stored independently of said base level state data.

20. Apparatus as claimed in claim 16, wherein program instruction control is operable to return said processing logic to said base level of said sequence of activation levels whilst remaining at a privileged level of a plurality of privilege levels including a privileged level and a user level.

21. Apparatus as claimed in claim 20, wherein one or more software accessible configuration bits controls whether said processing logic is at said user level or said privileged level of said plurality of privilege levels when at said base level of said sequence of activation levels.

22. Apparatus as claimed in claim 13, wherein said exception is one of:
a hardware generated interrupt; and
a software generated exception.

23. Apparatus as claimed in claim 13, wherein said base level state data includes one or more of:
one or more register values from a register bank;
a value stored within said process stack memory pointer;
a pending branch return address value;
a program counter value; and
one or more processor flag values.

24. Apparatus as claimed in claim 13, wherein said plurality of levels are a plurality of exception nesting levels.

25. A method of processing data, said method comprising the steps of:
storing data values in a memory;
executing a sequence of program instructions using processing logic having a plurality of levels including at least a base level and a non-base level;
pointing with a process stack memory pointer to a process stack memory region within said memory for use when said processing logic is at said base level;
pointing with a main stack memory pointer to a main stack memory region within said memory for use when said processing logic is at said non-base level;
in response to an exception occurring when said processing logic is executing a process sequence of program instructions at said base level, the following sequence of steps:
(i) stopping executing said process sequence of program instructions;
(ii) saving base level state data representing one or more state variables of said apparatus when said exception occurred to said process stack memory region;
(iii) switching said processing logic from said base level to said non-base level; and (iv) starting executing a non-base level sequence of program instructions.

26. Apparatus for processing data, said apparatus comprising:
   memory means for storing data values;
   processing means for executing a sequence of program instructions and having a plurality of levels including at least a base level and a non-base level;
   process stack memory pointer means for pointing to a process stack memory region within said memory for use when said processing logic is at said base level;
   main stack memory pointer means for pointing to a main stack memory region within said memory for use when said processing logic is at said non-base level;
   exception means, responsive to an exception occurring when said processing logic is executing a process sequence of program instructions at said base level in the following sequence, for:
   (i) stopping executing said process sequence of program instructions;
   (ii) saving state data representing one or more state variables of said apparatus when said exception occurred to said process stack memory region;
   (iii) switching said processing logic from said base level to said non-base level; and
   (iv) starting executing a non-base level sequence of program instructions.

27. Apparatus for processing data, said apparatus comprising:
   a memory configured to store data values;
   processing logic configured to execute a sequence of program instructions and having a plurality of levels including at least a process level and a kernel level;
   a process stack memory pointer configured to point to a process stack memory region within said memory for use when said processing logic is at said process level;
   a main stack memory pointer configured to point to a main stack memory region within said memory for use when said processing logic is at said kernel level;
   exception logic, responsive to an exception occurring when said processing logic is executing a process sequence of program instructions at said process level, said exception logic configured to implement the following sequence:
   (i) to stop executing said process sequence of program instructions;
   (ii) to save state data representing one or more state variables of said apparatus when said exception occurred to said process stack memory region;
   (iii) to switch said processing logic from said process level to said kernel level; and
   (iv) to start executing a kernel level sequence of program instructions.

28. Apparatus as claimed in claim 27, wherein said plurality of levels are a plurality of privilege levels, said process level is a user level and said kernel level is a privileged level.

29. Apparatus as claimed in claim 27, wherein said exception logic is operable upon returning to said process level to restart execution of said process sequence of program instruction to read said process level state data from said process stack memory region and to restore said one or more state variables of said apparatus.

30. Apparatus as claimed in claim 27, wherein said plurality of levels are a sequence of activation levels extending from said process level to one or more kernel levels, occurrence of an exception moving said processing logic to a next activation level away from said process level and a return from an exception moving said processing logic to a next activation level toward said process level.

31. Apparatus as claimed in claim 30, wherein, if said processing logic is not at said process level, then upon occurrence of said exception said state data is saved to said main stack memory region instead of to said process stack memory region.

32. Apparatus as claimed in claim 27, further comprising a further stack memory pointer pointing to a further stack memory region within said memory and a stack identifier associated with said exception and controlling said exception logic to store said state data to said further stack memory region rather than said main stack memory region.

33. Apparatus as claimed in claim 27, wherein state data defining a level of said processing logic upon occurrence of said exception is stored independently of said process level state data.

34. Apparatus as claimed in claim 30, wherein program instruction control is operable to return said processing logic to said process level of said sequence of activation levels whilst remaining at a privileged level of a plurality of privilege levels including a privileged level and a user level.

35. Apparatus as claimed in claim 24, wherein one or more software accessible configuration bits controls whether said processing logic is at said user level or said privileged level of said plurality of privilege levels when at said process level of said sequence of activation levels.

36. Apparatus as claimed in claim 27, wherein said exception is one of:
   a hardware generated interrupt; and
   a software generated exception.

37. Apparatus as claimed in claim 27, wherein said process level state data includes one or more of:
   one or more register values from a register bank;
   a value stored within said process stack memory pointer;
   a pending branch return address value;
   a program counter value; and
   one or more processor flag values.

38. Apparatus as claimed in claim 27, wherein said plurality of levels are a plurality of exception nesting levels.

39. A method of processing data, said method comprising the steps of:
   storing data values in a memory;
   executing a sequence of program instructions using processing logic configured to have a plurality of levels including at least a process level and a kernel level;
   pointing with a process stack memory pointer to a process stack memory region within said memory for use when said processing logic is at said process level;
   pointing with a main stack memory pointer to a main stack memory region within said memory for use when said processing logic is at said kernel level;
   in response to an exception occurring when said processing logic is executing a process sequence of program instructions at said process level, the following sequence of steps:
   (i) stopping executing said process sequence of program instructions;
   (ii) saving process level state data representing one or more state variables of said apparatus when said exception occurred to said process stack memory region;
   (iii) switching said processing logic from said process level to said kernel level; and
   (iv) starting executing a kernel level sequence of program instructions.

40. Apparatus for processing data, said apparatus comprising:

memory means for storing data values;

processing means for executing a sequence of program instructions and having a plurality of levels including at least a process level and a kernel level;

process stack memory pointer means for pointing to a process stack memory region within said memory for use when said processing logic is at said process level;

main stack memory pointer means for pointing to a main stack memory region within said memory for use when said processing logic is at said kernel level;

exception means, responsive to an exception occurring when said processing logic is executing a process sequence of program instructions at said process level in the following sequence, for:

(i) stopping executing said process sequence of program instructions;

(ii) saving process level state data representing one or more state variables of said apparatus when said exception occurred to said process stack memory region;

(iii) switching said processing logic from said process level to said kernel level; and (iv) starting executing a kernel level sequence of program instructions.

* * * * *